April 25, 1961  T. W. SAFFORD  2,981,921
CONNECTOR FOR CONNECTING A BRANCH WIRE TO
A CURRENT CONDUCTING THROUGH WIRE
Filed Nov. 3, 1958
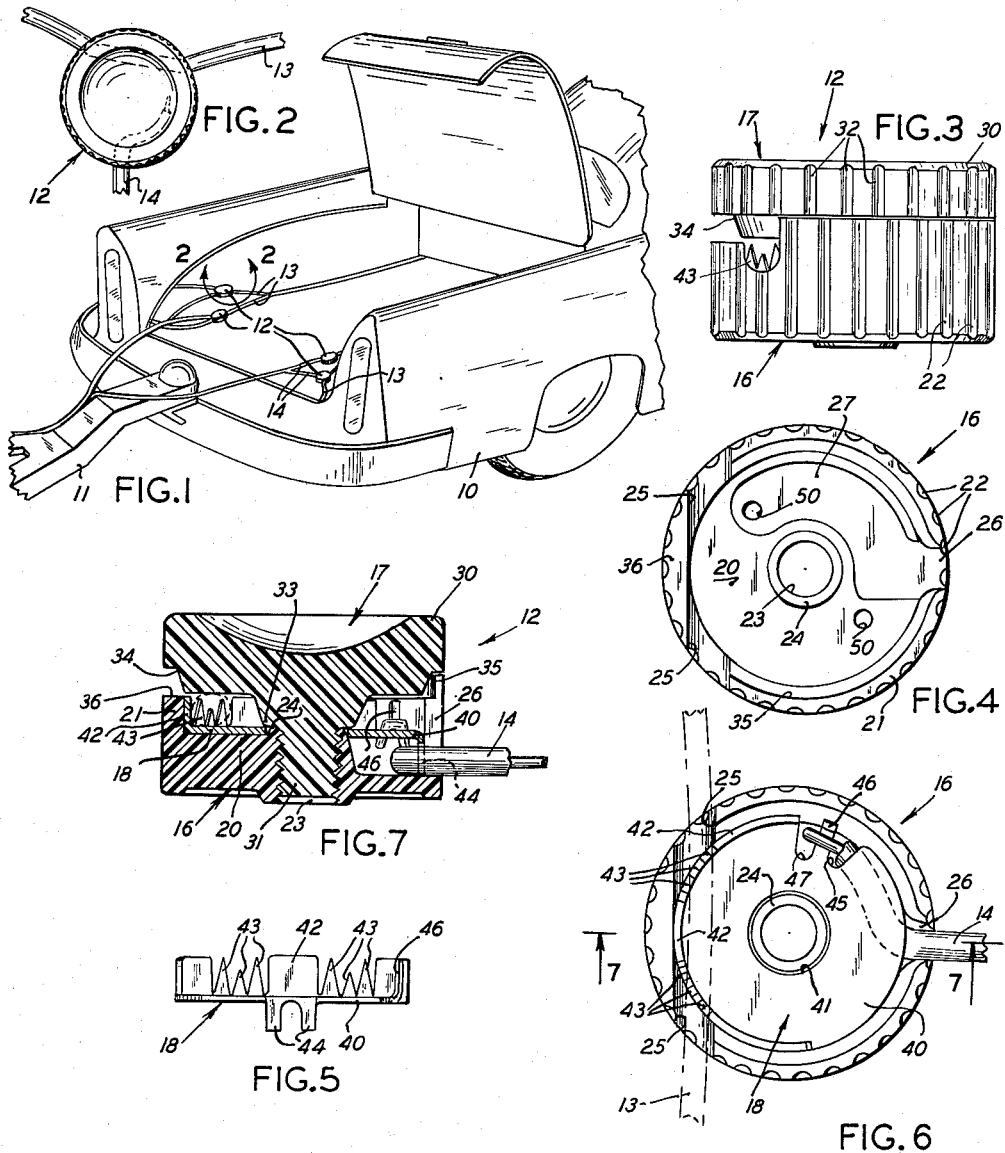
INVENTOR.
THOMAS W. SAFFORD
BY
BUCKHORN, CHEATHAM & BLORE
ATTORNEYS

United States Patent Office 2,981,921
Patented Apr. 25, 1961

2,981,921
CONNECTOR FOR CONNECTING A BRANCH WIRE TO A CURRENT CONDUCTING THROUGH WIRE

Thomas W. Safford, Portland, Oreg., assignor to Arcoa, Inc., Portland, Oreg., a corporation of Oregon Filed Nov. 3, 1958, Ser. No. 771,358

1 Claim. (Cl. 339—97)

The present invention relates to connectors for connecting branch wires to current conducting through wires. The invention is of particular utility in connecting stop and turning signal lights of a trailer to the wiring system of an automotive vehicle. Prior art devices for such purpose include jack and prong connectors, safety pins, and other devices, all of which known to me have certain drawbacks. Some such devices require the use of quantities of electricians' tape, either to hold the devices in position and in electrically insulated condition when in use, or to recover bared wires after the devices are removed. Some require the use of small screws which are easily lost, or fail to function because of their propensity for stripping the threads from threaded openings in insulator bodies. Safety pins are usually, in order to be sturdy enough for the purpose, too large for use with modern insulated wire. Other disadvantages are numerous and well known to those who have worked with such devices.

The present invention has for its principal object to provide a compact and sturdy connector which will function at all times, may be removed from association with the vehicle wiring system without requiring insulation of bared wires, has no small parts to become lost or small screws to strip threads from insulator bodies, and which may be retained in association with the branch wires of a lighting system, for example, ready for instantaneous reapplication at any time. An advantage of the present invention is that there is no necessity for stripping insulation from wires, or of using insulating tape in any fashion whatsoever.

It is to be appreciated that, while the principal use contemplated for the present invention is in a vehicle-trailer lighting system, the invention may be utilized in any association of branch wires with through wires.

The objects and advantages of the present invention will be more readily appreciated from inspection of the accompanying drawings, taken in connection with the following specification, wherein like numerals refer to like parts throughout and in which a preferred form of the invention is illustrated and described.

In the drawings,

Fig. 1 is a view in perspective of a portion of an automobile-trailer combination, showing a plurality of the present invention in use;

Fig. 2 is an enlarged plan view of one of the devices of the present invention in use as shown in the circle 2—2 of Fig. 1;

Fig. 3 is a side elevation of the present invention on a greatly enlarged scale;

Fig. 4 is a top plan view of the main housing element of the present invention separated from the other parts thereof;

Fig. 5 is a side elevation of a contact element forming a part of the present invention;

Fig. 6 is a plan view showing the contact element of Fig. 5 in association with the main housing element of Fig. 4 and illustrating the manner of associating conductor wires therewith; and Fig. 7 is a vertical section taken substantially along line 7—7 of Fig. 6.

In Fig. 1 there is illustrated a portion of an automobile 10 with which there is associated the drawbar 11 of a trailer vehicle. A plurality of the devices 12 of the present invention are shown in association of use connecting the through wires 13 of the automobile to the branch wires 14 of the trailer.

The device 12 consists of three parts, a main housing element 16, a pressure cap 17, and a conductor element 18.

The main housing element 16 is preferably in the form of a cup-shaped dielectric element having a cylindrical base 20 and a cylindrical flange 21 extending axially from one side of the base, the periphery of the element being longitudinally fluted as indicated at 22. The base is provided with a coaxial, threaded opening 23 extending therethrough, the inner end of which is preferably surrounded by a small coaxial bead 24. A pair of notches 25 is provided in the flange 21 in alignment along a chord of the base and at one side of the threaded opening 23. A third notch 26 extends radially through the flange 21 on the opposite side of opening 23, the bottom of the notch extending down into the base 20 and communicating with a groove 27 which extends partially around the opening 23 inside of the flange 21.

The pressure cap 17 comprises a dielectric element in the form of a screw having a large head 30 and a threaded stem 31. The periphery of the head 30 is preferably provided with longitudinal flutes 32. Between the stem 31 and the head 30 there is preferably provided a shoulder 33 which overlies the bead 24 when the parts are in association with each other. A portion of the head 30 is preferably rabbeted as indicated at 34, and the upper edge of the flange 21 is also rabbeted as indicated at 35, so that the two parts, when screwed together, have overlapping flanges to prevent foreign material from entering the device. The portion of the flange 21 between the notches 25, indicated at 36, is preferably relieved to a lower level than the remainder of the flange so that the through wire 13 retained within the notches 25 may be viewed from the exterior of the device when the parts are firmly screwed together.

The contact element 18 is made of conductive material in the form of a disc 40 of such size as to be retained within the flange 21 of the main housing element, the disc being provided with a coaxial opening 41 into which the bead 24 may extend. The element is provided with an axial flange 42 extending from one side thereof, which is provided with a plurality of serrations forming two sets of insulator piercing teeth 43. Preferably there are three teeth in each set, with the central tooth being shorter than the other teeth of each set. Each set of teeth 43 lies along the chord passing through the notches 25 when the disc is in use. On the opposite side of the contact element there is a pair of tabs 44 extending axially in the opposite direction from the edge of the disc. These tabs lie in alignment with the notch 26 and are adapted to grip the insulation of a branch wire 14 associated with the device in tight compression. As illustrated in Figs. 2 and 7, the inner end of the branch wire may be stripped of its insulation for a short distance. The branch wire extends along the groove 27 with its stripped end extending upwardly through a radial notch 45 in the disc 40, over a retainer tongue 46, and downward into a second radial notch 47 in the disc 40.

When the pressure cap is unscrewed from association with the main housing element, the contact element may be removed and a branch wire 14 associated therewith in the manner described. The contact element is then replaced, with the branch wire extending outwardly through the notch 26. A through wire is then placed in position above the piercing teeth 43 and held there while the pressure cap is screwed onto the main housing element. The housing element and the pressure cap form a cylindrical capsule enclosing the contact element. The head of the pressure cap overlies the through wire and forces the wire onto the piercing teeth 43, whereby one or more of the piercing teeth make contact with the wire. The through wire is thereby electrically joined to the branch wire. When it is desired to remove the trailer or other device which is thus associated with the current source, the pressure cap is unscrewed until the through wire may be lifted from its position. The small openings in the insulation of the through wire do not need rewrapping in order to insulate the wiring assembly.

The base 20 of the main housing element is preferably provided with a pair of small openings 50 on diametrically opposite sides of the element. A wire or tool may be inserted through one or the other of the openings to force the contact element out of the main housing element when the initial assembly of a branch wire therewith is being effected. The openings also provide passageway for the probe of a test lamp if it should be necessary.

Having illustrated and described a preferred embodiment of the present invention, it should be apparent to those skilled in the art that the same permits of modification in detail and arrangement. I claim as my invention all such modifications as come within the true spirit and scope of the appended claim.

I claim:

A connector for connecting a branch wire to a current conducting through wire comprising a main housing element of dielectric material, said main housing element comprising a disc base and a circumferential flange rising from one side of said base, said base having a central, threaded opening and said flange having a pair of notches therein in alignment with each other along a chord of the base at one sde of said opening, said flange having a relieved portion between said pair of notches extending to a lower level than the remainder of the flange, said flange also having a third notch therein, a pressure cap of dielectric material in the form of a screw having a large head and a threaded stem, said stem being engaged in said threaded opening, said stem being of such length as to allow a through wire to be inserted laterally over said relieved portion into said aligned notches in said flange while said stem is loosely engaged with the uppermost portion of said threaded opening and with said head overlying said flange, and a contact element of conductive material retained within said flange, said contact element being in the form of a disc having a central aperture for the passage of said stem and having an axially extending flange thereon provided with serrations forming a plurality of insulation-piercing teeth, and also having a bifurcated tab extending axially therefrom adapted to grip the insulation of an insulated branch wire whereby to hold said branch wire in association therewith, said tab being located so that when adjacent said third notch said teeth will be adjacent said pair of notches, the head of said screw applying pressure to force said teeth into said insulation and into contact with the through wire upon screwing said stem of said pressure cap into said threaded opening.

References Cited in the file of this patent

UNITED STATES PATENTS

| | | |
|---|---|---|
| 1,757,748 | Slade | May 6, 1930 |
| 2,112,752 | Abbott | Mar. 29, 1938 |
| 2,121,063 | Walter | June 21, 1938 |
| 2,352,224 | Read | June 27, 1944 |
| 2,372,653 | Becket | Apr. 3, 1945 |
| 2,476,738 | Klumpp | July 19, 1949 |
| 2,700,142 | Benander | Jan. 18, 1955 |

FOREIGN PATENTS

| | | |
|---|---|---|
| 560,413 | Great Britain | Apr. 4, 1944 |
| 821,014 | France | Aug. 17, 1937 |